US009643123B2

(12) United States Patent
Nulwala et al.

(10) Patent No.: US 9,643,123 B2
(45) Date of Patent: May 9, 2017

(54) HIGH PERFORMANCE HYDROPHOBIC SOLVENT, CARBON DIOXIDE CAPTURE

(71) Applicants: CARNEGIE MELLON UNIVERSITY, Pittsburgh, PA (US); U.S. Department of Energy, Washington, DC (US)

(72) Inventors: Hunaid Nulwala, Pittsburgh, PA (US); David Luebke, Bethel Park, PA (US)

(73) Assignees: CARNEGIE MELLON UNIVERSITY, Pittsburgh, PA (US); U.S. DEPARTMENT OF ENERGY, Washington, DC (US)

( * ) Notice: Subject to any disclaimer, the term of this patent is extended or adjusted under 35 U.S.C. 154(b) by 306 days.

(21) Appl. No.: 14/525,011

(22) Filed: Oct. 27, 2014

(65) Prior Publication Data

US 2015/0114226 A1    Apr. 30, 2015

Related U.S. Application Data

(60) Provisional application No. 61/961,967, filed on Oct. 28, 2013.

(51) Int. Cl.
*B01D 53/02* (2006.01)
*B01D 53/14* (2006.01)

(52) U.S. Cl.
CPC ..... *B01D 53/1493* (2013.01); *B01D 53/1475* (2013.01); *B01D 2252/204* (2013.01);
(Continued)

(58) Field of Classification Search
CPC ........ B01D 2252/204; B01D 2252/502; B01D 2258/0283; B01D 2259/4533; B01D 53/1475; B01D 53/1493; Y02C 10/06
See application file for complete search history.

(56) References Cited

U.S. PATENT DOCUMENTS

| 5,968,872 A | 10/1999 | Policello et al. |
| 8,771,403 B2 | 7/2014 | Chang et al. |

(Continued)

FOREIGN PATENT DOCUMENTS

| JP | 2013-064082 A | 4/2013 |
| WO | WO 2013/045424 A1 | 4/2013 |

OTHER PUBLICATIONS

Baranenko, et al., "Solubility of hydrogen in water in a broad temperature and pressure range", Translated from: Atomnaya Énergiya, vol. 66, No. 1, pp. 24-28, Jan., (1989).
(Continued)

*Primary Examiner* — Christopher P Jones
(74) *Attorney, Agent, or Firm* — The Marbury Law Group, PLLC

(57) ABSTRACT

Methods and compositions useful, for example, for physical solvent carbon capture. A method comprising: contacting at least one first composition comprising carbon dioxide with at least one second composition to at least partially dissolve the carbon dioxide of the first composition in the second composition, wherein the second composition comprises at least one siloxane compound which is covalently modified with at least one non-siloxane group comprising at least one heteroatom. Polydimethylsiloxane (PDMS) materials and ethylene-glycol based materials have high carbon dioxide solubility but suffer from various problems. PDMS is hydrophobic but suffers from low selectivity. Ethylene-glycol based systems have good solubility and selectivity, but suffer from high affinity to water. Solvents were developed which keep the desired combinations of properties, and result in a simplified, overall process for carbon dioxide removal from a mixed gas stream.

16 Claims, 16 Drawing Sheets

(52) U.S. Cl.
CPC .......... *B01D 2252/502* (2013.01); *B01D 2258/0283* (2013.01); *B01D 2259/4533* (2013.01); *Y02C 10/06* (2013.01)

(56) References Cited

U.S. PATENT DOCUMENTS

| | | | |
|---|---|---|---|
| 2006/0009555 A1* | 1/2006 | Haubennestel | C08G 77/445 524/261 |
| 2012/0055334 A1* | 3/2012 | Ogata | B01D 53/323 95/135 |
| 2013/0310569 A1 | 11/2013 | Nulwala et al. | |
| 2014/0186246 A1* | 7/2014 | Calabro | C08G 77/26 423/228 |

OTHER PUBLICATIONS

Brunner, E., "Solubility of hydrogen in 10 Organic Solvents at 298.15, 323.15, and 373.15 K", J. Chem. Eng. Date, 30, 269-273 (1985).
Byun, H-S, "Phase behavior for the poly(dimethylsiloxane) in supercritical fluid solvents", Journal of Industrial and Engineering Chemistry, 19, 665-669 (2013).
Descampes et al., "Solubility of hydrogen in methanol at temperatures from 248.41 to 308.20 K", Thermochimica Acta, 430, 1-7 (2005).
Field et al., "Baseline Flowsheet Model for IGCC with Carbon Capture", Ind. Eng. Chem. Res., 50(19), pp. 11306-11312 (2011).
Henni et al., "Solubilities of Carbon Dioxide in Polyethylene Glycol Ethers", Can.J.Chem.Eng., 83, 358-361 (2005).
Kovvali et al., "Carbon Dioxide Separation with Novel Solvents as Liquid Membranes", Ind. Eng. Chem. Res. 41, 2287-2295 (2002).
Mac Dowel et al., "An overview of $CO_2$ capture technologies", Phys. Chem. Chem. Phys., vol. 12, 1-28 (2010).
Marciniec (Ed.) "Hydrosilylation: A Comprehensive Review on Recent Advances (Advances in Silicon Science)", Springer (2009)—Table of Contents.
McKetta and Cunningham, "Encyclopedia of Chemical Processing and Design", vol. 69 (2002)—Table of contents.
March's "Advanced Organic Chemistry", $6^{th}$ Ed. (2007)—Table of Contents.
Miller et al., "New $CO_2$ Solvents based on $CO_2$-philic Oligomers", National Energy Technology Laboratory, date unknown.
Miller et al., "Solubility of $CO_2$ in $CO_2$-philic oligomers; COSMOtherm predictions and experimental results", Fluid.Phase, Equil. 287, 26-32 (2009).
Miller et al., "CO2-philic Oligomers as Novel Solvents for $CO_2$ Absorption", Energy Fuels, 24, 6214-6219 (2010).
National Institute of Standards and Technology, "Cost and Performance Baseline for Fossil Energy Plants: Bituminous Coal and Natural Gas to Electricity Final Report",Standard Reference Database No. 69, (2011); http://webbook.nist.gov/chemistry.
Porcheron et al.,"High Throughput Screening of $CO_2$ Solubility in Aveous Monoamine Solutions", Environ. Sci.Techol. 45, 2486-2492 (2011).
Prather et al., "Solubility of hydrogen in Creosote Oil at High Temperature and Pressure", Ind. Eng. Chem., Process. Des. Dev., 16(3) 267-270 (1977).
Raeissi et al., "Solubility in Ionic Liquids, Including Experimental Data in [bmim][$Tf_2N$]", AIChE Journal, Nov., 58(11) 3553-3559 (2012).
Reighard et al., "Determination of methanol/$CO_2$ and acetonitrile/$CO_2$ vapor-liquid phase equilibria using a variable-volume view cell", Fluid Phase Equilibria 123, 215-230 (1996).
Simnick et al., "Solubility of Hydrogen in Toluene at Elevated temperatures and Pressures", Journal of Chemical and Engineering Data, vol. 23(4) 339-340 (1978).
Wedlake et al., "Solubility of Carbon Dioxide in Silicone Oil", J.Chem.Eng.Data., 24, 305-6 (1979).
Xu et al., "Solubilities of Carbon Dioxide, Hydrogen Sulfide and Sulphur Dioxide in Physical Solvents", Can.J.Chem.Eng., 70, 569-573 (1992).
Zieverink et al., "Gas-Liquid Mass Transfer in Benchscale Stirred Tanks-Fluid Properties and Critical Impeller Speed for Gas Induction", Ind. Eng. Chem. Res., 45 (13), 4574-4581 (2006).
Zieverink et al., "Combined Hydrogenation and Isomerization Combined Hydrogenation and Isomerization under Diffusion Limiting Conditions", Ind. Eng. Chem. Res. 44, 9668-9675 (2005).

* cited by examiner

R = H, Methyl, Ethyl, Propyl group
m, n = number of repeat units

HIGH PERFORMANCE HYDROPHOBIC SOLVENT, CARBON DIOXIDE CAPTURE

RELATED APPLICATIONS

This application claims priority to U.S. provisional application 61/961,967 filed Oct. 28, 2013 which is hereby incorporated by reference in its entirety for all purposes.

FEDERAL FUNDING

This invention was made with government support under contract number DE-FE0004000 awarded by the Department of Energy. The government has certain rights in the invention.

BACKGROUND

A variety of methods have been proposed to capture $CO_2$ including solvent, sorbent, and membrane methods. Among solvent methods, chemical and physical methods have been suggested for the pre-combustion and post-combustion capture of $CO_2$, respectively. At low $CO_2$ partial pressures of about 0.01-0.015 MPa associated with post-combustion capture of $CO_2$ from flue gas, amine solutions are favored because they will react with dilute concentrations of $CO_2$. For example, a 30 wt % solution of monoethanolamine (MEA) in water will bind $CO_2$ as a water-soluble ammonium carbamate at a 2:1 molar ratio of MEA:$CO_2$, enabling this solution to absorb about 11 wt % $CO_2$. $CO_2$ release and solvent regeneration is accomplished via heating (Porcheron et al. 2011, MacDowell et al. 2010). A listing of references cited herein is provided hereinbelow.

In contrast, pre-combustion capture of $CO_2$ is typically accomplished with physical solvents, given that the high partial pressure of $CO_2$ in the fuel gas stream is sufficient to dissolve significant amounts of $CO_2$ into the solvent without the need for chemical reaction. For example, at 25° C., if the partial pressure of $CO_2$ is about 1 MPa, about 5 wt % $CO_2$ will dissolve in the polymeric Selexol™ that is commonly employed for low temperature $CO_2$ absorption. Regeneration of the solvent and release of the $CO_2$ can be accomplished with temperature increase and/or pressure reduction.

Numerous small volatile compounds such as methanol and acetone (Miller et al. 2011) and oligomers or polymers have been considered as physical $CO_2$ solvents (Miller et al. 2009). The most common polymeric $CO_2$ solvent is based on an extremely hydrophilic polymer, polyethyleneglycol dimethylether (PEGDME). For example, the solvent used in the Selexol™ process (McKetta and Cunningham, 1995; Reighard et al. 1996) is a proprietary formulation that is rich in PEGDME. Given that the $CO_2$ solvent strength of PEGDME increases with decreasing temperature and increasing pressure, it is not surprising that in most IGCC plant designs (IGCC is Integrated Gasification Combined Cycle), the $CO_2$ absorption is typically conducted at high pressure and low temperature (about 40° C.); at these conditions most of the water vapor in the post-WGSR stream has been condensed and separated from the $CO_2$- and $H_2$-rich gas stream that is fed to the absorption column. Therefore the complete miscibility of PEGDME and water is not problematic because there is very little water vapor (on a mass basis) in the gas entering the absorption column even though the gas is saturated with water.

However, the energetic and capital costs associated with cooling the fuel gas stream to 40° C. are substantial. Consider a typical IGCC fuel gas stream (31 mol % $CO_2$, 43% $H_2$, 23% $H_2O$, and 3% of other gases such CO, COS, $H_2S$) leaving the WGSR (WGSR is water gas shift reaction) at 250° C. and 5.5 MPa. The stream could be cooled isobarically to its dew point of about 180° C. before its gas phase composition would change as water began to condense. Process modeling at the US DOE NETL has indicated that if $CO_2$ can be selectively removed from within the WGSR or from the post-WGSR stream with little or no cooling, and if the remaining $H_2$—$H_2O$ gas mixture is combusted to generate the hot, high pressure gas stream that is expanded in the gas turbine, the IGCC plant thermal efficiency could increase by 2-3 percentage points.

There would be large advantages in identifying physical solvents for selective $CO_2$ capture from a hot or warm high pressure gas stream rich in $CO_2$, $H_2O$ and $H_2$. The main disadvantage of PEGDME for this higher temperature absorption is its complete miscibility with water. PEGDME-rich solvents, such as Selexol™, would remove both the water and the $CO_2$ from the hot, humid fuel gas.

Although phase behavior studies involving polymeric solvents have been conducted, most reports focus on $CO_2$ solubility at low temperature. For example, a prior study of phase behavior at 25° C. (Miller et al., 2009) considers PEGDME 250 and three hydrophobic polymers, polypropyleneglycol dimethylether based on the branched (1,2 propanediol) monomer (PPGDME$_b$ 230), perfluoropolyether (PFPE 960), and polydimethylsiloxane (PDMS 237). (In each case the average molecular weight of the polymer is provided after its acronym.) Concerning hydrophobicity, PDMS and PFPE are completely immiscible with water, PEGDME is completely miscible with water in all proportions, and PPGDME$_b$ absorbs several weight percent water at ambient temperature. When $CO_2$ solvent strength is assessed on a weight percentage basis, PEGDME and PPGDME$_b$ are comparable $CO_2$ solvents. PDMS dissolves slightly less $CO_2$ than the polyethers at the same temperature and pressure, and PFPE absorbs significantly less $CO_2$ (Miller et al. 2009). The solubility of $CO_2$ in polyethylene glycols of varying molecular weight, ranging from ethylene glycol monomethyl ether up to PEGDME 250 has also been reported at temperatures up to 60° C. (Henni et al., 2005). An earlier paper (Xu et al. 1992) reported similar results for the solubility of $CO_2$ in Selexol™. The solubility of $CO_2$ in a fluorinated silicone oil, trifluoropropylmethylsiloxane, with a kinematic viscosity of 300 centistokes has also been determined (Wedlake and Dobinson, 1979). The $CO_2$-philicity of all of these solvents is attributable to multiple, favorable Lewis acid:Lewis base interactions between $CO_2$ and the monomeric unit of each polymer.

A need exists to develop hydrophobic solvents that would absorb as much $CO_2$ and as little $H_2O$ and $H_2$ as possible at temperatures above 40° C. for efficient capture of $CO_2$. More particularly, a need exists to provide better compounds, compositions, solvents, and processes for separation of gases at appropriate temperature and under industrial process conditions, including addressing the issues of water noted above and improving on existing ethylene-glycol based processes, compounds, and compositions. Examples of prior art are US Pat. Pub. 2013/0310569. See also, M. B. Miller, et al., *Fluid Phase, Equil.* 287, 26-32 (2009); M. B. Miller, et al., *Energy Fuels,* 24, 6214-6219 (2010); and Kovvali et al., *Ind. Eng. Chem. Res.,* 41 (2002), 2287-2295.

SUMMARY

Embodiments described herein include, for example, compounds and compositions, and methods of making and methods of using the compounds and compositions. Systems and devices can also be provided which use these compounds and compositions and relate to the methods.

For example, one lead aspect provides for a method comprising: contacting at least one first composition comprising carbon dioxide with at least one second composition to at least partially dissolve the carbon dioxide of the first composition in the second composition, wherein the second composition comprises at least one siloxane compound which is covalently modified with at least one non-siloxane group comprising at least one heteroatom.

Another aspect is for a composition comprising at least one siloxane compound which is covalently modified with at least one non-siloxane group comprising at least one heteroatom, wherein the compound has a molecular weight of 500 g/mol or less.

An example of a preferred aspect is a method comprising: capturing carbon dioxide with use of a physical solvent of an ethylene oxide modified polydimethylsiloxane compound.

One embodiment provides for a composition comprising at least one covalently modified siloxane compound as described herein and at least one solvent or carrier for the siloxane compound.

One embodiment also is a device comprising at least one covalently modified siloxane compound as described herein. For example, the device can be a biomedical device.

One aspect also is a method comprising contacting the composition as described herein with a gaseous composition.

In the lead aspect, the second composition, in some embodiments, can include compounds and compositions which can be called a "hybrid hydrophobic solvent," wherein the hybrid nature is described further herein. Examples of new hybrid hydrophobic solvents as a replacement for ethylene-glycol based solvent processes for $CO_2$ capture (e.g. Selexol™) have been synthesized and characterized (see hereinbelow working examples, in particular).

One or more advantage can be found in one or more of the embodiments described and claimed herein. For example, the compositions such as hybrid hydrophobic solvents based on (TEG-Si) described herein can alleviate the problems with water solubility. Some of the advantages of this new system process utilizing the hydrophobic solvent materials are summarized in (FIG. 1). Importantly, the new materials can allow removal of sulfur compounds and $CO_2$ compounds at warmer temperatures without the need of a water removal step. When comparing the process flow of hydrophobic $CO_2$ capture using the Selexol process or the hybrid hydrophobic solvent system described herein, it is apparent that the new system can result in overall simplification of the gas removal and can bring down the capital cost of $CO_2$ capture since there isn't a loss of energy at the water removal step. The hybrid solvents have the combined advantages of PDMA and ethylene glycol-based solvents, provide a simpler process, and also provide favorable viscosities providing easier processing. Good thermal stability can also be achieved in at least some embodiments. The covalent bonding approach allows solutions to problems which could not be solved by merely mixing two solvents together without covalent bonding. For such mere mixing, the components would phase separate too much to be useful.

DETAILED DESCRIPTION

Introduction

Figure 1:
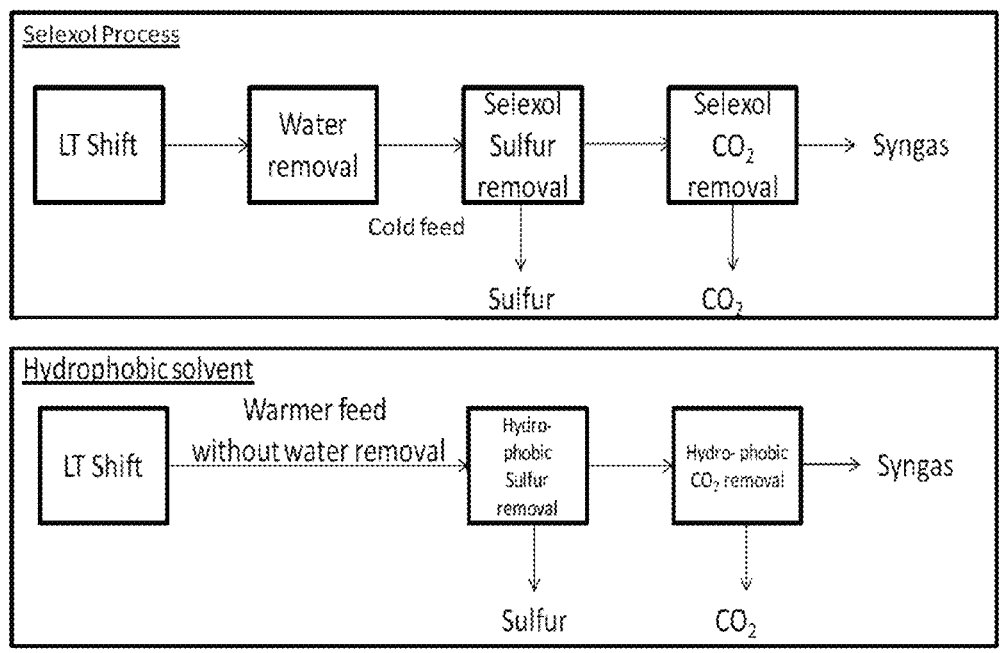
FIG. 1 illustrates for one embodiment the process flow of hydrophobic $CO_2$ capture using the prior art Selexol process (upper) or the new hybrid hydrophobic solvent system (lower) described herein. "LT Shift" is "low temperature shift."

Priority U.S. provisional application 61/961,967 filed Oct. 28, 2013 is hereby incorporated by reference in its entirety for all purposes including figures, tables, and working examples.

References cited herein are listed hereinbelow.

The open transition term "comprising" is broader than and includes also embodiments for partially closed transition term "consisting essentially of" and closed term "consisting of" as interpreted by the US PTO and the courts.

For purposes herein, the alkyl moieties noted herein can be linear or cyclic alkyl groups. They can be monovalent or bivalent or trivalent. They can be optionally substituted as known in the art.

One lead aspect provides for a method comprising: contacting at least one first composition comprising carbon dioxide with at least one second composition to at least partially dissolve the carbon dioxide of the first composition in the second composition, wherein the second composition comprises at least one siloxane compound which is covalently modified with at least one non-siloxane group comprising at least one heteroatom.

The elements of this lead aspect are described in more detail hereinafter.

One particularly preferred aspect is a method comprising: capturing carbon dioxide with use of a physical solvent of an ethylene oxide modified polydimethylsiloxane compound.

First Composition

The first composition is contacted with the second composition, and the first composition comprises carbon dioxide. The first composition can comprise many components, including gaseous components, but typically will comprise carbon dioxide and hydrogen, or carbon dioxide, hydrogen, and water. Other components which can be present include, for example, carbon monoxide, COS, and hydrogen sulfide. In many situations, the goal will be to separate carbon dioxide from another component such as hydrogen. In many situations, advantages can be obtained when water is allowed to be present, or steps are not taken to remove water. The first composition can be saturated with water, including water vapor. The amount of water is not particularly limited, but in many cases will be saturated at the particular temperature of the first composition. The saturation amount, as known in the art, can be adapted for the particular temperature and pressure.

In some embodiments, the mole percent of carbon dioxide is about 10% to about 60%, or about 20% to about 50%, or about 25% to about 35%.

In some embodiments, the mole percent of hydrogen can be about 10% to about 70%, or about 20% to about 60%, or about 30% to about 50%.

In some embodiments, the mole percent of carbon dioxide can be about 5% to about 50%, or about 10% to about 40%, or about 15% to about 30%.

The combined mole percent of carbon dioxide and hydrogen in the first composition can be, for example, about 50% to about 90%, or about 60% to about 85%, or about 70% to about 80%.

The combined mole percent of carbon dioxide, hydrogen, and water in the first composition can be, for example, about 80% to about 99%, or about 90% to about 98%, or about 95% to about 98%.

The first composition can be part of a capture process for carbon dioxide, including both pre-combustion and post-combustion capture. Post-combustion processes can include flue gas. The first composition can be part of an IGCC plan. The first composition also can be part of a water gas shift reaction including the post-WGSR stream.

Another parameter for the first composition is pressure and partial pressure. In some examples, low carbon dioxide partial pressures can be present such as, for example, about 0.01 MPa to about 0.015 MPa. In some examples, relatively high carbon dioxide partial pressures can be present such as, for example, 0.1 MPa to 50 MPa, or 0.1 MPa to 10 MPa.

Another parameter for the first composition is temperature. The temperature can vary throughout the processing but can be, for example, at the contacting step 0° C. to 90° C., or 10° C. to 90° C., or 40° C. to 90° C., or 40° C. to 80° C. One can adapt the temperature to achieve the best balance of conditions including selectivity.

Second Composition

The second composition, which is contacted with the first composition so that at least some of the carbon dioxide of the first composition is dissolved in the second composition, comprises at least one siloxane compound which is covalently modified with at least one non-siloxane group comprising at least one heteroatom.

Siloxane compounds are known in the art and, generally, are compounds which comprise or are based on the single moiety or repeat moiety —[O—SiR$_1$R$_2$]— as known in the art. They can be low molecular weight compounds or oligomers, for example. Siloxane compounds which are modified with heteroatom groups are known in the art. See, for example, U.S. Pat. No. 5,968,872; JP 2013064082; and WO 2013/045424.

In one embodiment, the heteroatom is nitrogen or oxygen. In one embodiment, the heteroatom is oxygen. In one embodiment, the non-siloxane group comprising at least one heteroatom comprises an alkyleneoxy group, an amino group, an ester group, or a ketone group. In one embodiment, the non-siloxane group comprising at least one heteroatom comprises an alkyleneoxy group. In one embodiment, the non-siloxane group comprising at least one heteroatom comprises an ethyleneoxy group, a propyleneoxy group, or a butyleneoxy group.

In one embodiment, the siloxane compound has two to twelve Si atoms, wherein in another embodiment, the compound has three to six Si atoms, and in another embodiment, the compound has three or four Si atoms, and in another embodiment, the compound has three Si atoms.

In one embodiment, the siloxane compound has a molecular weight of 2,000 or less, or 1,000 or less, or 500 g/mol or less. The siloxane compound can have a molecular weight of at least 200 g/mol, or at least 250 g/mol, or at least 300 g/mol. One can adapt the molecular weight to provide the best combination of properties including vapor pressure and viscosity.

In one embodiment, the compound is a liquid or oil when pure at 25° C. The compound is not a solid at 25° C. in this embodiment. Preferably, for some embodiments, the vapor pressure of the compound is as low as possible.

In some embodiments, the siloxane compound can be represented by the following formula:

(A)$_x$-(B)$_y$ wherein A is a group comprising the siloxane moiety, and B is a non-siloxane group comprising the heteroatom, and A and B are covalently linked. The values x and y are integers, independently of each other, so that the compound can be represented as, for example, (A)$_1$-(B)$_1$, or just (A)-(B). The values of x and y can be, for example, independently of each other integers of 1-10, or 1-5, or 1-3, or just 1. For example, in one embodiment, A is a monovalent moiety (CH$_3$)$_3$Si—O—Si(CH$_3$)—O—Si(CH$_3$)$_3$, wherein the interior Si atom links to the B group which is the non-siloxane group comprising the heteroatom. Herein, x can be 1 and y can be 1. In some embodiments, the B moiety links to the A moiety via a propylene bridging or linking group, —CH$_2$CH$_2$CH$_2$—.

In some embodiments, the siloxane compound can also be represented by, for example, (A)$_x$-(B)$_y$-(A)$_x$, wherein B is the non-siloxane moiety comprising the heteroatom and A is a siloxane moiety, and y is 1 and x is 1. For example, the B group can be bivalent and the two A groups can be each monovalent. In some embodiments, the A groups independently of each other have three or more Si atoms. In one embodiment, the A groups have only three Si atoms. In some embodiments, again, the B moiety links to the A moiety via a propylene bridging or linking group, —CH$_2$CH$_2$CH$_2$—.

In some embodiments, the siloxane compound also can comprise a "terminal siloxane moiety" (TSM) wherein the TSM is represented by the monovalent group, as known in the art, R$_1$R$_2$R$_3$—Si—O—. The R moieties R$_1$R$_2$R$_3$ here are typically non-reactive monovalent alkyl moieties such as a C$_1$-C$_{10}$ moiety such as methyl or ethyl. A preferred TSM is (CH$_3$)$_3$—Si—O—.

In some embodiments, the siloxane compound can be, for example, further represented by:

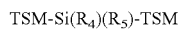

TSM-Si(R$_4$)(R$_5$)-TSM wherein R$_4$ is similar to R$_1$-R$_3$ noted above and is a monovalent alkyl group such as a C$_1$-C$_{10}$ moiety such as methyl or ethyl; and R$_5$ is the non-siloxane group comprising the heteroatom such as oxygen or nitrogen. In some embodiments, the R$_5$ moiety links to the Si moiety via a propylene bridging or linking group, —CH$_2$CH$_2$CH$_2$—.

In some embodiments, the siloxane compound can be, for example, further represented by:

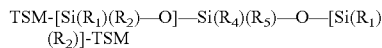

TSM-[Si(R$_1$)(R$_2$)—O]—Si(R$_4$)(R$_5$)—O—[Si(R$_1$)(R$_2$)]-TSM wherein R$_1$, R$_2$, and R$_4$ are similar to R$_1$-R$_3$ noted above and are each a monovalent alkyl group such as a C$_1$-C$_{10}$ moiety such as methyl or ethyl; and R$_5$ is the non-siloxane group comprising the heteroatom such as oxygen or nitrogen. In some embodiments, the R$_5$ moiety links to the Si moiety via a propylene bridging or linking group, —CH$_2$CH$_2$CH$_2$—.

In some embodiments, the siloxane compound is represented by:

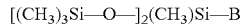

[(CH$_3$)$_3$Si—O—]$_2$(CH$_3$)Si—B wherein B is a non-siloxane group comprising at least one ethyleneoxy or propyleneoxy moiety. In one embodiment, B comprises at least two ethyleneoxy or propyleneoxy moieties, or B comprises at least three ethyleneoxy or propyleneoxy moieties, or B comprises at least four ethyleneoxy or propyleneoxy moieties. In some embodiments, B comprises ten or fewer ethyleneoxy or propyleneoxy moieties, or B comprises five or fewer ethyleneoxy or propyleneoxy moieties. In some embodiments, the B moiety links to the siloxane moiety via a propylene bridging or linking group, —CH$_2$CH$_2$CH$_2$—.

In one embodiment, the siloxane compound does not include bivalent —OSiMe$_2$- moieties.

In one embodiment, the siloxane compound is not a compound described in U.S. Pat. No. 5,968,872; and not a compound as described in WO 2013/045424; and not a compound as described in JP 2013/064082

Figure 2:
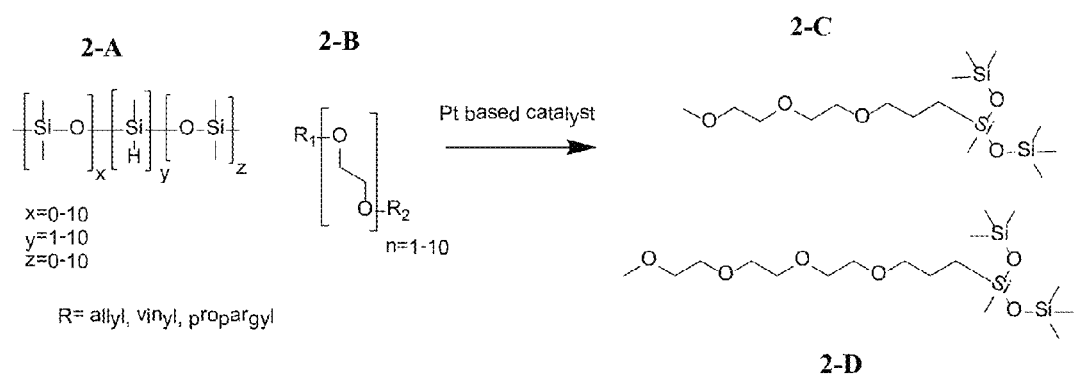
FIG. 2 illustrates for one embodiment the general synthesis of hybrid-PDMS-TEG utilizing Pt based catalyst. Compounds of type 2-A can be reacted with compounds of type 2-B to form compounds of types 2-C and 2-D.
Figure 3:
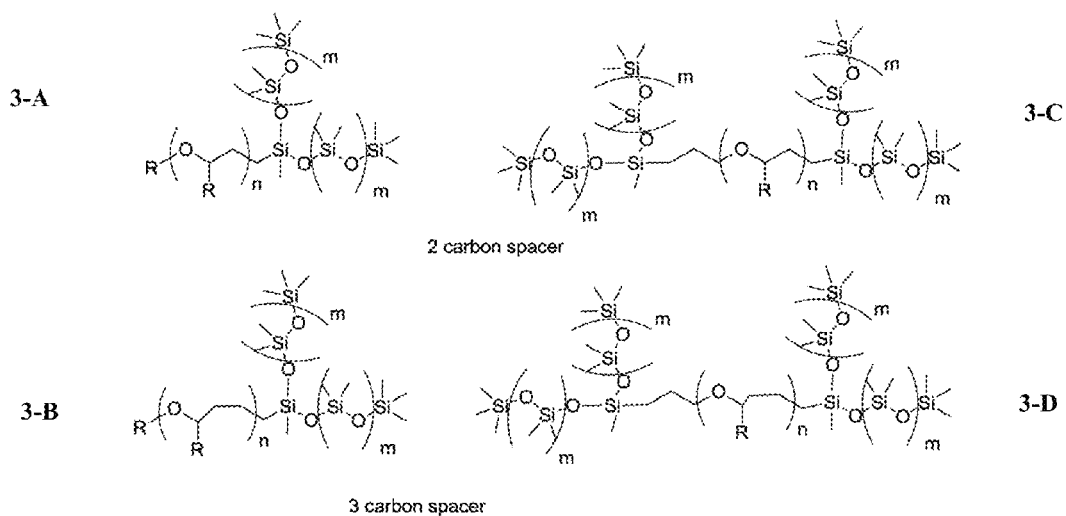
FIG. 3 illustrates for one embodiment types of compounds included in the hydrophobic solvent design described herein, including four compound types called 3-A, 3-B, 3-C, and 3-D.

FIGS. 2 and 3 illustrate additional representations of the siloxane compound covalently modified with at least one non-siloxane moiety comprising the heteroatom. FIG. 2 is described more below. In FIG. 3, four types of compounds 3-A, 3-B, 3-C, and 3-D are shown. In each case, the values of n and m represent number of repeat units and can be tailored to the product and can be selected independently of each other. For example, in compounds 3-A-3-D, m can be zero or an integer of 1-10, or 1-5, or 1-3, and n can be an integer of 1-10, or 1-5, or 1-3. The substituent group R can be, for example, hydrogen, methyl, ethyl, or propyl. Compounds 3-A and 3-C illustrate use of ethyleneoxy moiety, and compounds 3-B and 3-D illustrate use of propyleneoxy moiety.

For the second composition, mixtures of two or more siloxane compounds can be used.

The siloxane compound can be included in a composition comprising one or more ingredients or additional solvents which are not according to the embodiments described herein including additives.

The covalently modified siloxane compound also can be described by its properties. For example, one important property of the solvent compound of the second composition is viscosity. Suitable viscosity can provide for good mass transfer and quick uptake of gas in the solvent. Viscosity can vary with the temperature, but at or near 25° C., for example, viscosity can be less than 50 mPa·s. For example, Table 1 in the working examples provides viscosity data at 22.9° C., including thermal stability data. The viscosity can be, for example, about 0.1 mPa·s to about 100 mPa·s, or about 0.5 mPa·s to about 25 mP·s, or about 0.5 mPa·s to about 10 mP·s, or about 1 mPa·s to about 5 mP·s. Experimental error can be, for example, ±0.02 mP·s. Lower viscosity is useful for ease of transport and pumping.

Another important property is quick uptake of the extracted gas into the compound.

Another important property is reduced amounts of water absorption. The compound should be hydrophobic. The absorbed water content should be, for example, about 1 wt. % or less, or about 0.1 wt. % or less.

Another important property of the solvent compound of the second composition is thermal stability, including stability at temperatures over 100° C., including at or over 120° C. Thermal stability can be examined by different methods including, for example, thermal gravimetric analysis (TGA) or effect of temperature on a property such as viscosity. In a TGA test, the stability can be, for example, at least 150° C., or at least 200° C. There is no particular upper limit, but thermal stability can be up to 300° C., for example. A rapid drop off in weight can be observed at or around the stability temperature.

The solvent compound of the second composition can also have a melting temperature as shown in a thermal method like differential scanning calorimetry (DSC) which is, for example, less than 25° C., or less than 0° C., or less than −25° C., or less than −50° C. There is no particular lower limit on melting temperature, but melting temperature can be, for example, greater than −100° C.

Other properties include, for example, vapor pressure, heat capacity, density, surface tension, and thermal conductivity. In addition, solubility properties and selectivity against the solubility of different gas mixtures are also important.

Preferably, the second composition has as its major component the modified siloxane compound. For example, the amount of the modified siloxane compound in the second composition can be, for example, at least 70 wt. %, or at least 80 wt. %, or at least 90 wt. %, or at least 95 wt. % with respect to the entire second composition.

Contacting Step

The first and second compositions are brought together in a contacting step. The temperature and pressure of the first composition, the temperature and pressure of the second composition, and the temperature and pressure of the contacting step can be adapted for the process.

A variety of container, absorber, or tower devices as known in the art can be used for the contacting step. The size and shape, for example, can be varied. The container can have one or more input ports and one or more exit ports. For example, the contacting step can be carried out in an absorption column. In the contacting step, a gas such as the first composition can be passed through a liquid composition such as the second composition. One can adapt the parameters to achieve a desired percentage of carbon dioxide capture such as, for example, at least 70%, or at least 80%, or at least 90% carbon dioxide capture. Recycling can be carried out where solvent is looped back into a reactor for further processing. In one embodiment, after the contacting step, the second composition with its dissolved carbon dioxide is subjected to one or more carbon dioxide removal steps to form a third composition which is further contacted with a first composition comprising carbon dioxide.

Other known processing steps can be carried out. For example, filtering can be carried out. As known in the art, pumps, coolers, and heaters can be used.

The contacting step can be part of a larger process flow with other steps both before and after the contacting step. For example, membrane separation steps can also be carried out as part of the larger process. For example, PBI membranes can be used.

The contacting step can be also part of a larger process in which sulfur components, including hydrogen sulfide, are removed.

In one preferred embodiment, the step of eliminating or reducing water water content in the first composition is eliminated in a larger process flow. This can avoid reducing the temperature of the gas stream which provides for savings in capital and energy costs.

After at least partial dissolution of the carbon dioxide in the second composition comprising at least one siloxane compound which is covalently modified with at least one non-siloxane group comprising at least one heteroatom, the siloxane compound can be separated from the carbon dioxide and recycled.

In a preferred embodiment, the contacting step is part of a carbon capture process. For example, an IGCC plant and carbon capture are described in, for example, Field et al., *Ind. Eng. Chem. Res.*, 2011, 50 (19), p. 11306-11312. See also, for example, National Energy Technology Laboratory (NETL) report *Cost and Performance Baseline for Fossil Energy Plants: Bituminous Coal and Natural Gas to Electricity Final Report*; U.S. Department of Energy, Office of Fossil Energy, NETL, DOE/NETL-2010/1397, 2010. As known in the art, pre-combustion capture processes and compression cycles can be carried out.

Continuous or batch processing can be carried out.

The contacting step results in at least partial dissolution of the carbon dioxide of the first composition in the second composition.

Methods of Making Compounds and Compositions

Methods known in the art can be used to make the organosilicon compounds including the modified siloxane compound including as illustrated in the working examples and FIG. 2 and FIG. 3 and claimed herein. In FIG. 2, as known in the art, a siloxane compound (2-A) with Si—H group, and optional —OSi(CH$_3$)$_2$— moieties, and terminal —OSi(CH$_3$)$_3$ moieties, is reacted with an unsaturated compound (2-B). Compound 2-B comprises an unsaturated group $R_1$ adapted to react with —Si—H—, as well as one or more ethyleneoxy moieties, and is terminated with an $R_2$ group. The $R_1$ group can be, for example, allyl, vinyl, or propargyl. A Pt based catalyst, as known in the art, is used to form the product. The product is a modified siloxane compound such as compound 2-C having two ethyleneoxy moieties terminated with a methoxy group or a modified siloxane compound 2-D having three ethyleneoxy moieties terminated with a methoxy group. In each case, in the reaction product 2-C or 2-D, the siloxane moiety is linked to the oligomeric ethyleneoxy moiety via a —(CH$_2$CH$_2$CH$_2$)— spacer. As shown in FIG. 2, the type of siloxane compound can be varied with variation in the variables x, y, and z and the n values.

The hydrosilylation reaction, also called hydrosilation reaction, can be used. See, for example, "Hydrosilylation, A Comprehensive Review on Recent Advances" B. Marciniec (ed.), *Advances in Silicon Science*, Springer Science, 2009. See, also, March's *Advanced Organic Chemistry*, 6$^{th}$ Ed., 2007, including pages 1086-1088. Generally, hydrosilylation describes the addition of Si—H bonds across unsaturated bonds. In many embodiments, the reaction is conducted catalytically and usually the substrates are unsaturated organic compounds. Alkenes and alkynes give alkyl and vinyl silanes; aldehydes and ketones give silyl ethers. Herein, the hydrosilation can be adapted to provide the claimed and described compounds.

As known in the art, dehydration reactions can also be used to prepare the siloxane compounds.

Embodiment for Prevention of Misting

In some embodiments, it is desired to reduce or eliminate misting, aerosol formation, and/or foaming. Hence, a variety of additives can be used including additives which change surface tension such as surfactants. In addition, in some cases, anti-foaming agents or defoamers can be added. Known anti-foaming agents and defoamers can be used including, for example, oil-based, powder, water-based, silicone-based, ethyleneoxy/propyleneoxy-based and alkyl polyacrylates. In particular, commonly used agents which can be used include, for example, insoluble oils, polydimethylsiloxanes and other silicones, certain alcohols, stearates and glycols. The amount of the anti-foaming agent can be, for example, amounts known to those skilled in the art.

In other embodiments, however, foaming may be desired.

Methods of Using Compounds and Compositions

Capturing carbon dioxide is one use or method of use. Other uses and methods of uses include, for example, reaction media for water sensitive reactions, extraction of metals from aqueous materials, heat transfer fluid, solvent for natural gas sweetening, surfactant for variety of applications, lubricating fluids, and solvent media to disperse nanoparticles.

Additional uses and methods of uses include, for example, oil and natural gas applications where carbon dioxide and sulfur dioxide needs to be removed, metal extractions, and replacement for current electrolytes in battery applications.

The compounds and compositions can be also used in biomedical applications.

Working Examples

Additional embodiments are provided in the following non-limiting working examples and further descriptions from the working examples.

In two embodiments, hybrid PDMS-triethyleneglycol (TEG) and PDMS-Tetraethyleneglycol (T4EG) solvents were synthesized (FIG. 2). This same synthesis can be applied to access a large library of molecules as new solvents for carbon capture. Additional possible examples are illustrated in FIG. 3. Furthermore, the ethylene glycol moiety is not limited to TEG, but other linear and branched alkyl chains, of varying lengths, can be utilized.

Figure 4:
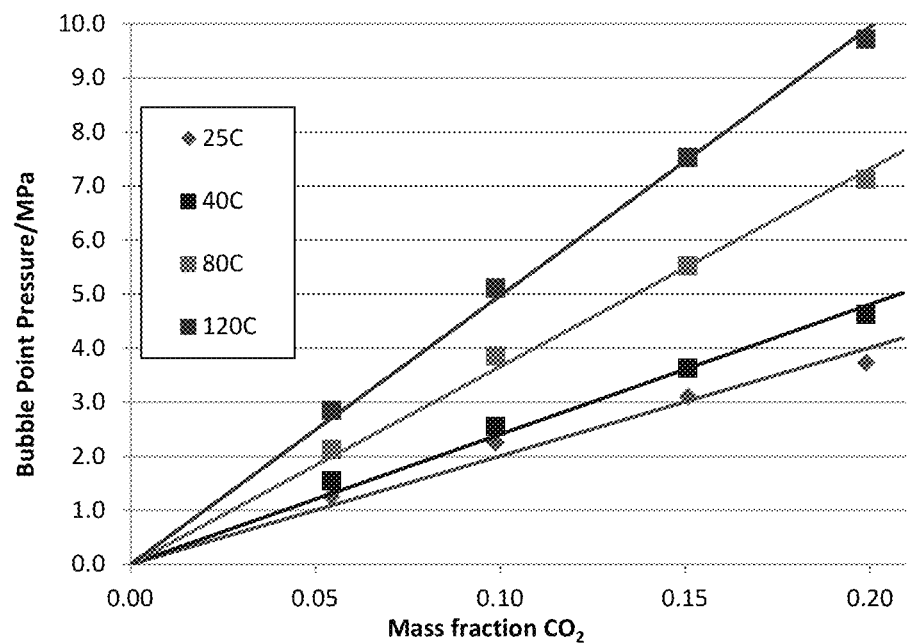
FIG. 4 illustrates for one embodiment the effect of temperature on bubble point pressure for $CO_2$ in TEG-Si hybrid solvent system at 25° C., 40° C., 80° C. and 120° C., reflecting solubility of $CO_2$.
Figure 5:
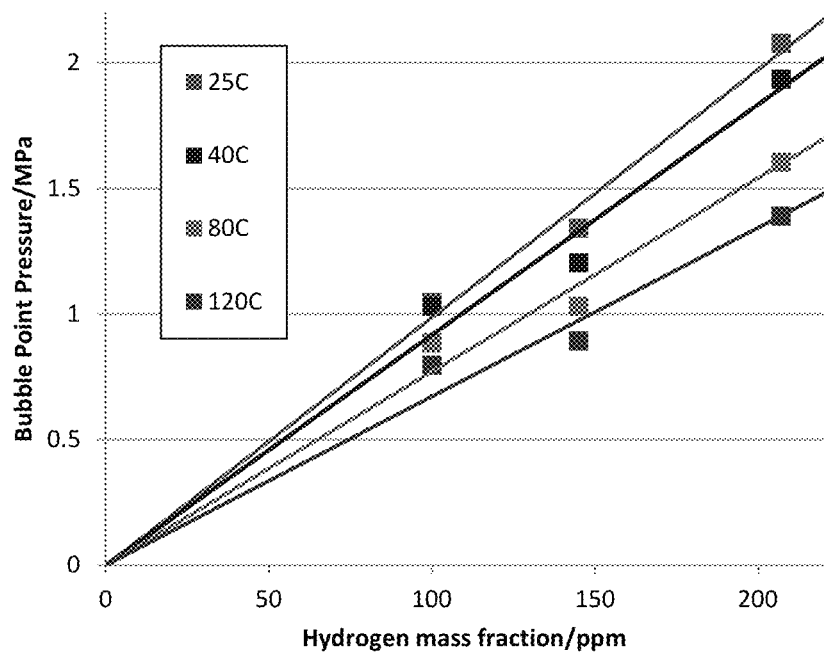
FIG. 5 illustrates for one embodiment the effect of temperature on bubble point pressure for hydrogen in TEG-Si hybrid solvent system at 25° C., 40° C., 80° C. and 120° C., reflecting solubility of $H_2$.

The hybrid PDMS-TEG solvent was tested for $CO_2$ and $H_2$ solubility at various temperatures. FIG. 4 is a plot showing the solubility of $CO_2$ in the hybrid PDMS-TEG solvent at four temperatures (25° C., 40° C., 80° C. and 120° C.), and FIG. 5 is a plot showing the solubility of $H_2$ in the hybrid PDMS-TEG solvent at the same temperatures. It can be seen that the solubility drops (the bubble point pressure increases) as the temperature increases. This is detrimental, as it would be preferred that at higher temperatures the solvent would dissolve more $CO_2$. However, it can be seen that at the pressure at which the gas leaves the WGSR (5.5 MPa) a reasonable amount of $CO_2$ can dissolve in the solvent (as much as 10% at 120° C.) and less at higher temperatures.

It is also desired that the solvent not dissolve large amounts of $H_2$ such that all of the $H_2$ pass into the combustion chamber. Unlike the solubility of $CO_2$, where the solubility of $CO_2$ goes down as the temperature goes up, the solubility of $H_2$ increases as the temperature increases (FIG. 5). The increase in hydrogen solubility with temperature over wide temperature ranges has been observed previously for solutions of $H_2$ in many solvents, such as creosote (Prather et al. 1977), water (Baranenko and Kirov 1989), methanol (Descampes et al. 2005), and toluene (Simnick et al. 1978). Bruner's study (Brunner 1985) substantiated this behavior for 10 organic solvents over the 298-373 K temperature range. In a recent study on this phenomenon in $H_2$-ionic liquid systems (Raeissi and Peters 2012), it was concluded that the primary factors responsible for this behavior is the extreme lightness and small intermolecular forces of hydrogen molecules, which approach those of an ideal gas. Because of its small size and the absence of intermolecular forces, the increasing $H_2$ solubility in the solvent was attributed to the expansion of the solvent upon heating (all of the solvents used in this study exhibited decreasing density with increasing temperature). Unlike $CO_2$, which exhibits multiple, specific, favorable thermodynamic interactions with the solvents that diminish in strength with increasing temperature, there are no analogous favorable thermodynamic interactions for the $H_2$-solvent mixtures, and therefore no associated decrease in the magnitude of such interactions that diminishes $H_2$ solubility. This density decrease is associated with increased free voids within the large polymer molecules into which the $H_2$ can reside. This effect is thought to be very significant because even the slightest decrease in density resulting from a temperature increase results in very small free spaces that the extremely small hydrogen molecule can still manage to fit into, thus increasing solubility.

Figure 6:
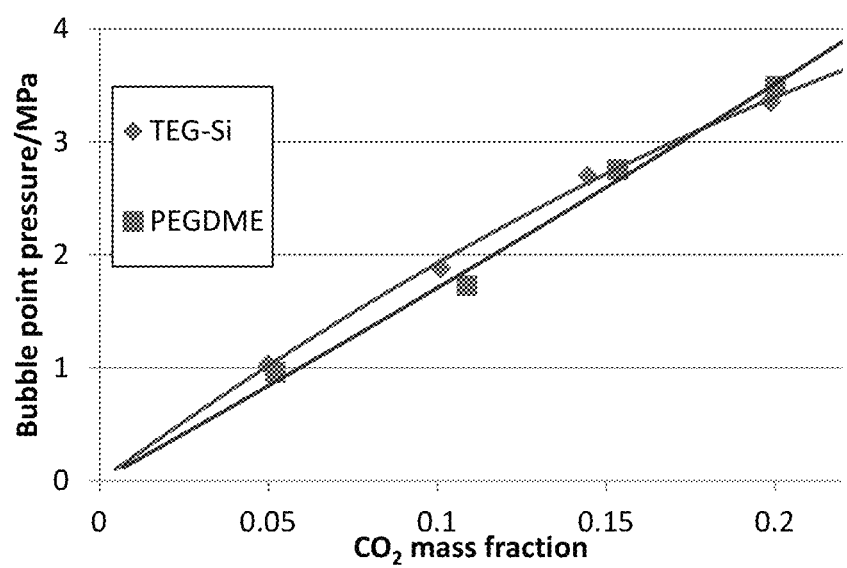
FIG. 6 shows for one embodiment a comparison of the relative solubility of $CO_2$ in the TEG-Si hybrid and PEGDME at 25° C.
Figure 7:
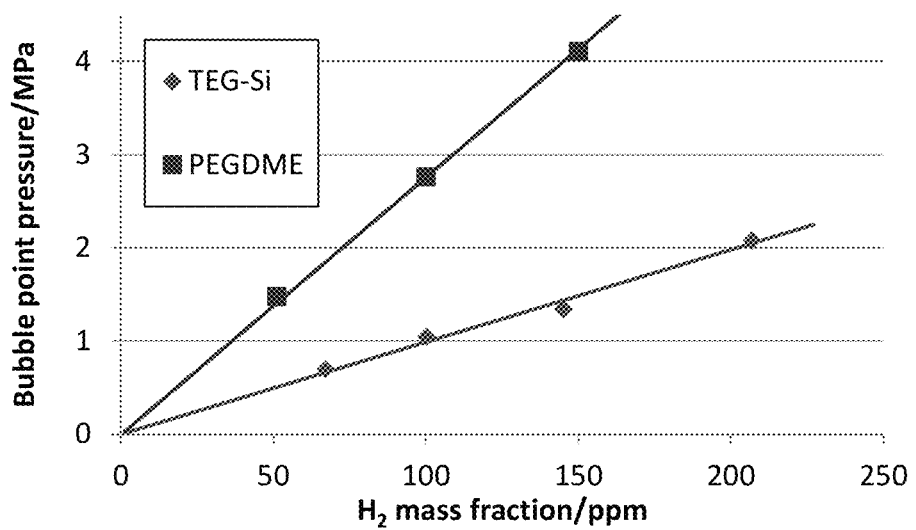
FIG. 7 shows for one embodiment a comparison of the relative solubility of $H_2$ in TEG-Si and PEGDME at 25° C.

FIG. 6 compares the relative solubility of $CO_2$ in the hybrid PDMS-TEG solvent and PEGDME (Selexol) at 25° C. It can be seen that the solubility is similar, even though the hybrid PDMS-TEG solvent is $H_2O$ immiscible while PEGDME is water miscible. FIG. 7 compares the relative solubility of $H_2$ in the hybrid PDMS-TEG solvent and PEGDME at 25° C. Here it can be seen that $H_2$ is more soluble in the hybrid solvent than in PEGDME, though the solubility of $H_2$ is about two to three orders of magnitude lower than the solubility of $CO_2$.

Figure 8:
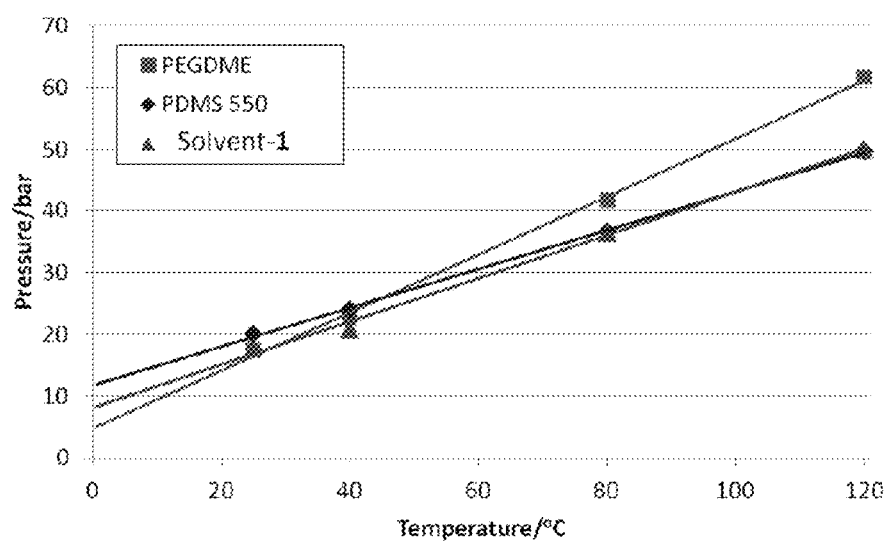
FIG. 8 shows for one embodiment strength of three solvents, PDMS 550, PEGDME, and the TEG-Si hybrid (labeled as Solvent 1) for $CO_2$, shown as bubble pressure for a 10 wt % $CO_2$ mixture of $CO_2$ in the solvent, as the temperature increases.
Figure 9:
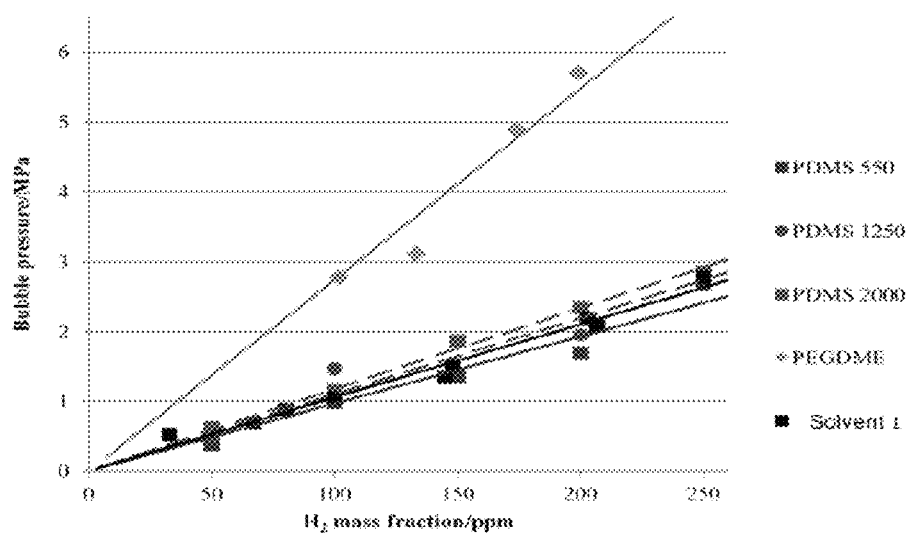
FIG. 9 shows for one embodiment the variation of the bubble point pressure against $H_2$ mass fraction for three PDMS molecular weights, PEGDME, and the hybrid TEG-Si hybrid molecule (labeled as Solvent 1) all at 25° C., as the mass fraction of $H_2$ is varied.
Figure 10:
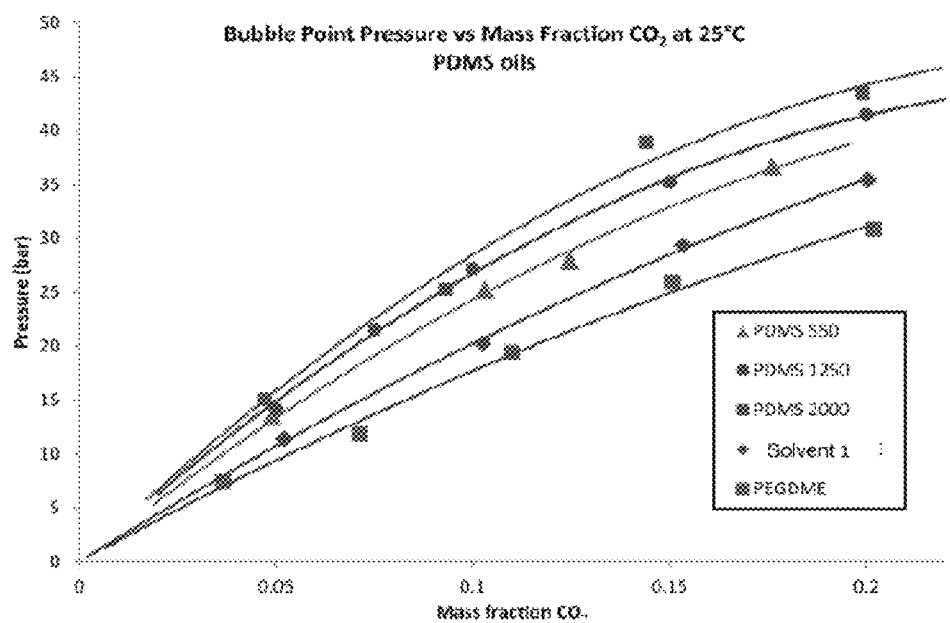
FIG. 10 shows for one embodiment the variation of bubble point pressure versus $CO_2$ mass fraction for three PDMS molecular weights, PEGDME and the hybrid TEG-Si hybrid molecule (labeled as Solvent 1) all at 25° C.

It is important to note that solubility of $CO_2$ gets lower as the temperature increases, while the solubility of $H_2$ increases. However, the solubility of $CO_2$ is about three orders of magnitude larger than the solubility of $H_2$ at 25° C. and two orders of magnitude larger at 120° C. The hybrid PDMS-TEG solvent is better solvent than PDMS and compares well with PEGDME without the issue of water solubility (FIG. 8). Additional comparisons of the variation of bubble point pressure against $H_2$ (or $CO_2$) mass fraction for 3 different PDMS molecular weights, PEGDME and an exemplary hybrid PDMS-TEG solvent are illustrated in FIGS. 9 and 10, respectively.

Figure 11:
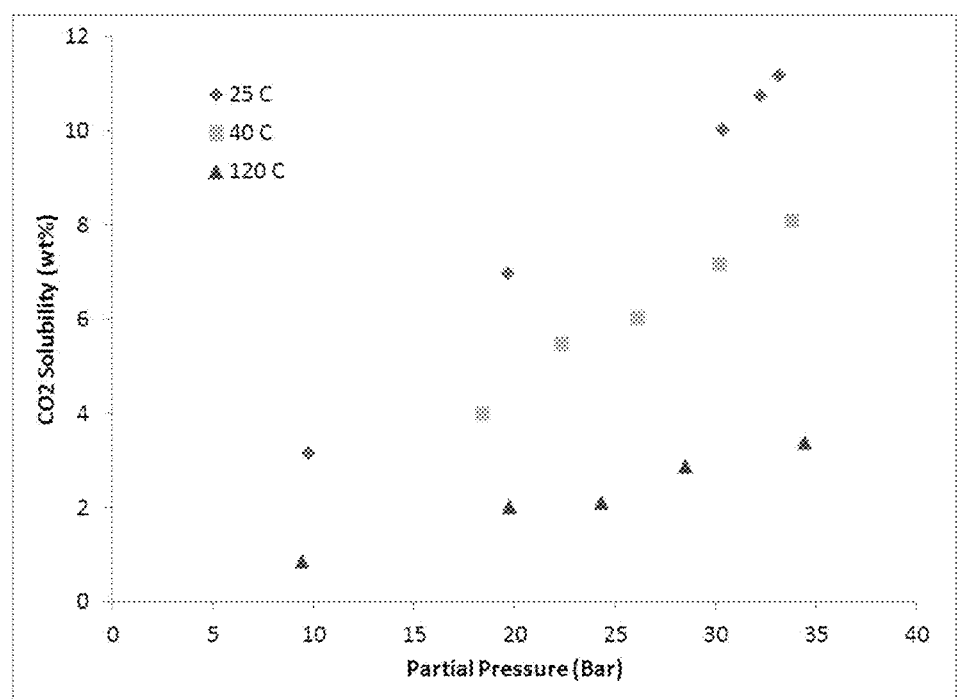
FIG. 11 shows for one embodiment $CO_2$ isotherms in an equal molar $CO_2/H_2$ mixture in PDMS-50 at 25° C., 40° C. and 120° C.

Additionally, isotherms of $CO_2/H_2$ binary mixture were measured. Isotherms of $CO_2$ in an equal molar $CO_2/H_2$ mixture in PDMS-50 at 25° C., 40° C. and 120° C. are shown in FIG. 11. It can be seen that the $CO_2$ solubility almost linearly increased along with the pressure. At 20 bars of $CO_2$, which is close to the $CO_2$ partial pressure in pre-combustion flue gas, the $CO_2$ solubility was about 7.6 wt %, 4.0 wt %, and 2.0 wt % at 25° C., 40° C. and 120° C., respectively. $CO_2$ solubility results at 25° C. and 120° C. were comparable to previous reported results measured by the bubble-points method (Miller 2010, Byun 2013). It can be seen that $CO_2$ solubility decreased with increasing temperature.

Figure 12:
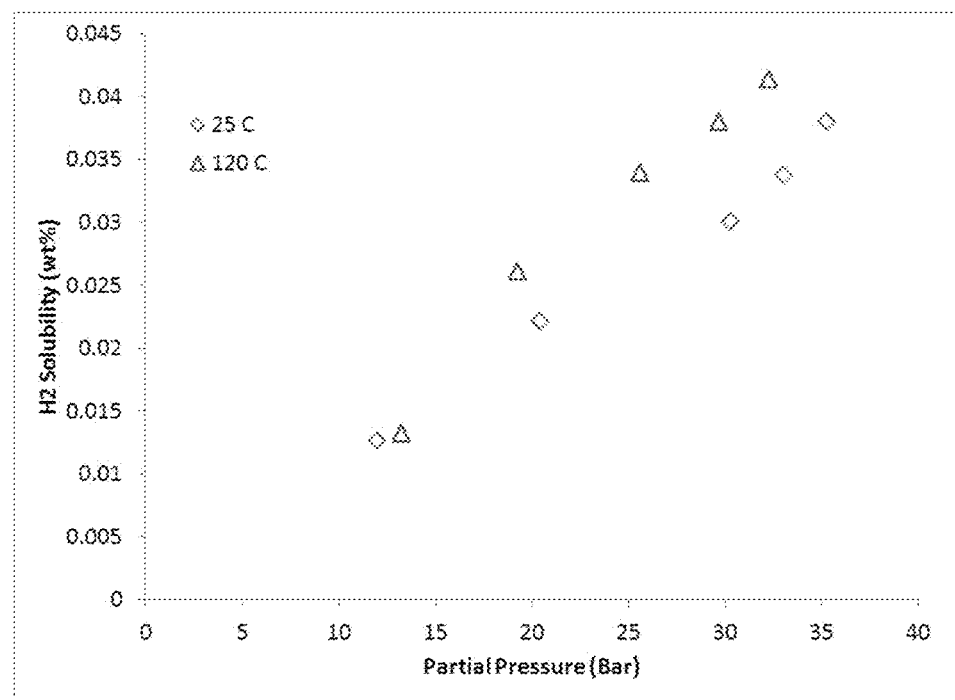
FIG. 12 shows for one embodiment $H_2$ isotherms in an equal molar $CO_2/H_2$ mixture in PDMS-50 at 25° C. and 120° C.

Isotherms of $H_2$ in an equal molar $CO_2/H_2$ mixture in PDMS-50 at 25° C. and 120° C. were shown in FIG. 12. $H_2$ solubility increased along with the partial pressure, but was much smaller compared to $CO_2$ solubility. At 25 bars of $H_2$, which is close to the $H_2$ partial pressure in pre-combustion flue gas, the $H_2$ solubility was about 0.035 wt % at 120° C. Different from the absorption of $CO_2$, it can be seen that $H_2$ solubility increased with increasing temperature. Similar observations have been reported for $H_2$ in other solvents as well (Simnick et al. 1978, Baranenko and Kirov 1989, and Descampes et al. 2005). Possibly, this is because the expanded volume of physical solvents at a high temperature can accommodate more small size $H_2$ than at low temperatures.

Figure 13:
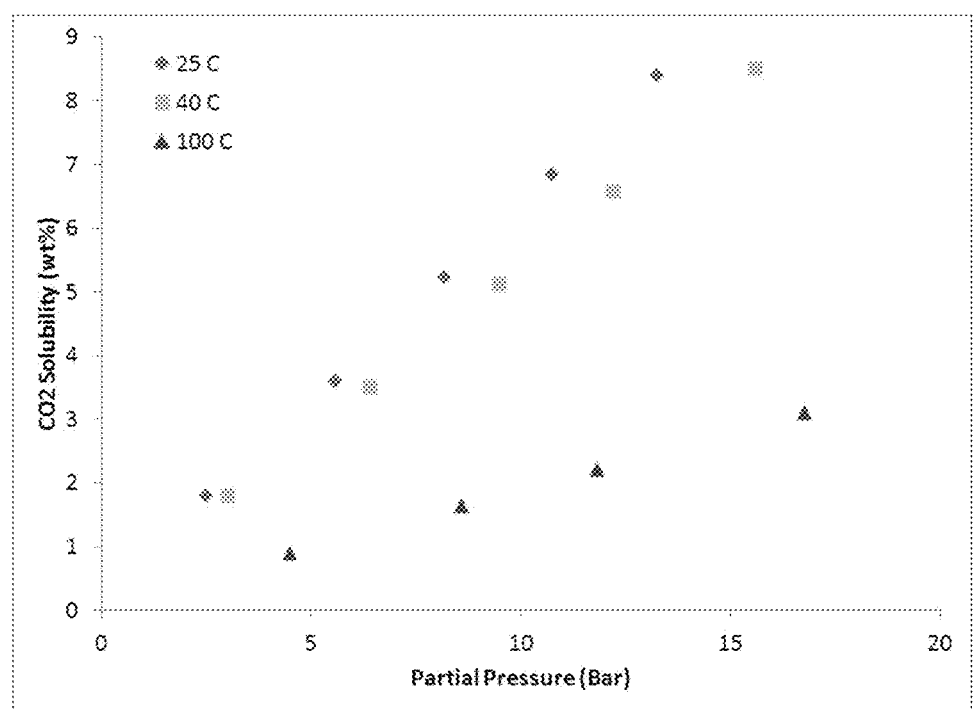
FIG. 13 shows for one embodiment $CO_2$ isotherms in an equal molar $CO_2/H_2$ mixture in the hybrid PDMS solvent at 25° C., 40° C. and 100° C., respectively.

Isotherms of $CO_2$ in an equal molar $CO_2/H_2$ mixture in the hybrid PDMS solvent at 25° C., 40° C. and 100° C. were shown in FIG. 13. It can be seen that $CO_2$ solubility in hybrid-PDMS was much higher than those in PDMS-50. At 10 bars of $CO_2$, half of the $CO_2$ partial pressure in pre-combustion gas, the $CO_2$ solubility was about 6 wt %, 5 wt %, and 2 wt % at 25° C., 40° C. and 100° C., respectively. This is primarily due to the modification of siloxane backbone. This covalent modification of the siloxane with ethylene glycol plays a significant role in carbon dioxide absorption in the hybrid-PDMS solvent.

Figure 14:
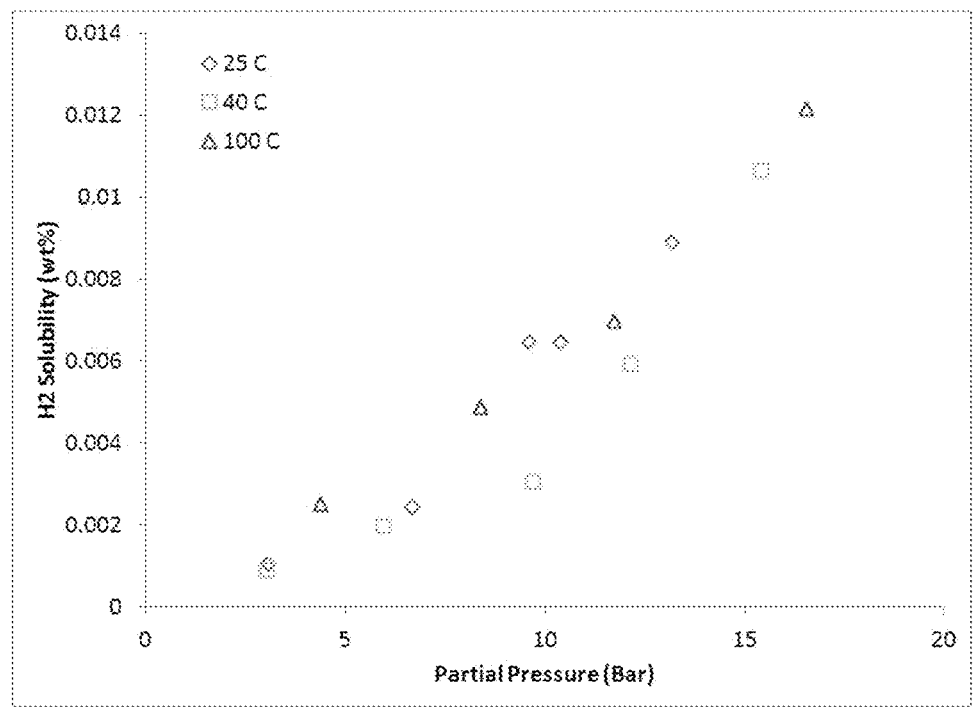
FIG. 14 shows for one embodiment $H_2$ isotherms in an equal molar $CO_2/H_2$ mixture in the hybrid PDMS solvent at 25° C., 40° C. and 100° C., respectively.

Isotherms of $H_2$ in an equal molar $CO_2/H_2$ mixture in hybrid-PDMS at 25° C., 40° C. and 100° C. were shown in FIG. 14. Comparing to the results in PDMS-50, $H_2$ solubility was much smaller, indicating a better $CO_2$ selectivity over $H_2$. Different from the absorption in pure PDMS-50, it can be seen that $H_2$ solubility results were close at different temperatures.

Viscosities of fresh and spent PDMS-50 and hybrid-PDMS solvents were measured, as shown in Table 1. Both spent solvents were collected after $CO_2/H_2$ absorption test up at a temperature to 120° C. There was no significant change in viscosity of solvent after exposed to fuel gas at near pre-combustion carbon capture conditions, indicating excellent thermal stability of solvents. Furthermore, the viscosity of the hybrid solvent is good for mass transfer and quick uptake of gas in the solvent.

TABLE 1

Viscosities of fresh and spent PDMS-50 and hybrid-PDMS solvents

| Solvent | Viscosity, mPa · s @22.9 C. | |
|---|---|---|
| | Fresh | Spent |
| PDMS-50 | 57.4 ± 0.2 | 56.7 ± 0.1 |
| Hybrid- PDMS PDMS-triethyleneglycol (TEG), | 2.96 ± 0.02 | 3.12 ± 0.03 |
| Hybrid- PDMS PDMS-tetraethyleneglycol | 3.36 ± 0.02 | 3.54 ± 0.02 |

Figure 15:
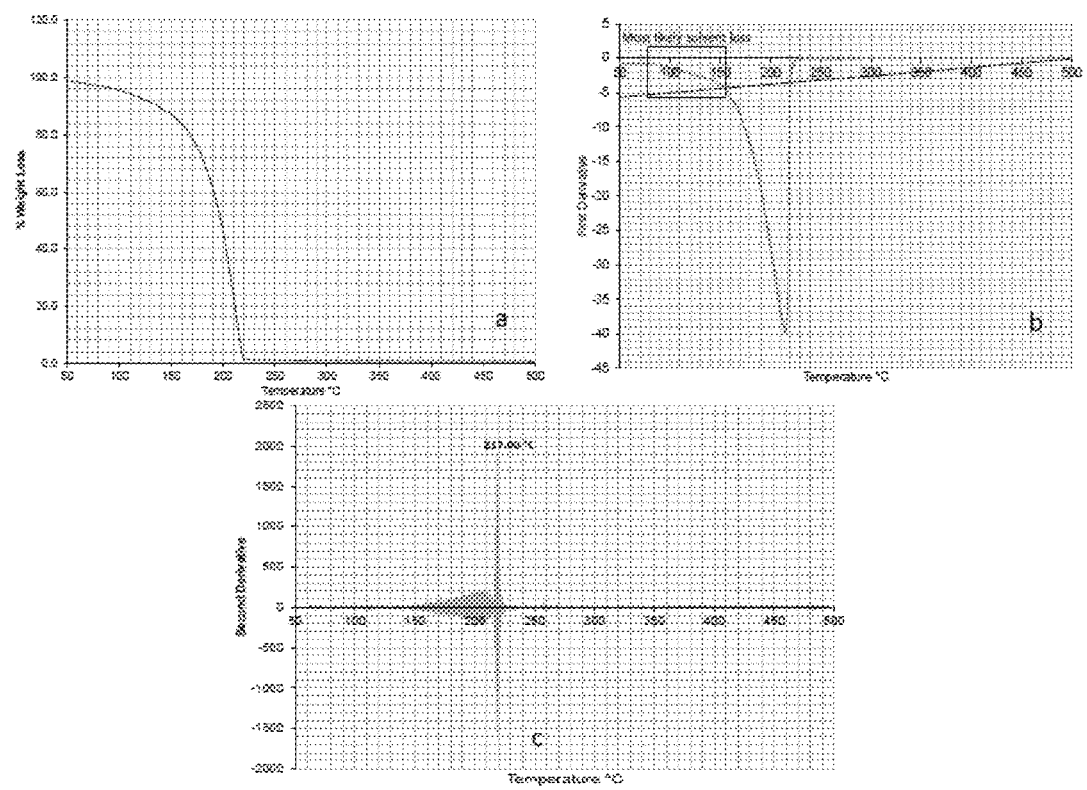
FIG. 15 shows for one embodiment TGA of profiles of hybrid PDMS-TEG. a) % weight loss with temperature b) first derivative with respect to temperature c) second derivative with respect to the temperature.

Thermal characterization, illustrated in FIG. 15, shows that the hybrid PDMS solvent is stable up to 218° C. The synthesized solvent is thermally stable which gives a wider processing window for the gas separation.

In addition, melting temperature was measured for the hybrid PDMS solvent compound. A standard DSC run with a heating and cooling rate of 10° C./minute was conducted from −100° C. to 100° C. with four heating cycles to ensure repeatability of the results. From the third and fourth heating curves, the DSC data indicates that there is a crystallization peak with a peak maximum at −90° C. and a melting peak with a peak maximum at −72° C. during the heating cycle of the DSC run.

Example applications of this hydrophobic solvent system include, but are not limited to, $CO_2$ capture, extraction technologies for metals from aqueous solvents, heat transfer fluid applications, surfactants, electrolyte for batteries, and nanoparticle dispersion applications. The hydrophobic hybrid solvent systems have been demonstrated and described in accordance with several examples, which are intended to be illustrative in all aspects rather than restrictive. Thus, the present invention is capable of many variations in detailed implementation, which may be derived from the description contained herein by a person of ordinary skill in the art.

Experimental Methods $CO_2$ and $H_2$ Solubility

All phase behavior measurements of each binary system were carried out in an invertible, high pressure, variable-volume, windowed, agitated, view cell (Schlumberger). The stainless steel cell had 8" high, 1.5" wide, 0.5" thick pressure-retaining borosilicate windows on opposing sides of the vessel. The cell, which is rated to 69 MPa at 180° C., housed a thick-walled Pyrex tube (1.25" ID, 1.75" OD, 8.000" length, Schlumberger Ltd.) with polished ends that contains a floating piston and has a working (sample) volume of up to 100 mL. A transparent overburden fluid (e.g. water, silicone oil) resided beneath the floating piston and around the piston; therefore the wall of the tube was not subject to a differential pressure. The piston retained a Buna-N O-ring that maintained a seal between the sample volume above the piston and the overburden fluid below the piston. An about 0.05 MPa pressure drop was required to move the piston. Larger O-rings were seated above and below the polished ends of the Pyrex tube.

The solubility of $CO_2$ and $H_2$ in the solvents was determined using standard non-sampling techniques for bubble point detection described in detail for $CO_2$ bubble points elsewhere (Miller et al. 2009, Miller et al. 2010). In all cases, a single phase mixture of known overall composition was very slowly expanded until a single, persistent bubble was observed in equilibrium with the liquid phase. The bubble point data were determined at 298K, 313K, 353K and 393K at $CO_2$ mass fractions ranging between 0.04 and 0.25 or $H_2$ mass fractions ranging between 0.00005 and 0.00025 (50 to 250 ppm). The high pressure apparatus was housed in an air bath environmental chamber (Cincinnati Sub Zero Products Inc.) capable of controlling the temperature between 253 K and 453 K, as measured with a type K thermocouple to an accuracy of ±0.2 K. In a typical experiment for a $CO_2$ bubble point, 30 g of solvent was loaded gravimetrically from a syringe into the Pyrex tube on top of the piston. The tube, piston and solvent were then placed in the top opening of the view cell. The steel end cap of the view cell, which also contained the mixer and the port for the venting or addition of gas into the sample volume, was then bolted to the top of the vessel. A computer-controlled positive displacement (PD) pump (Schlumberger) was used to displace the overburden fluid into the bottom of the view cell below the piston, thereby displacing the piston and the solvent upward and decreasing the gas-filled volume above the solvent. This process was halted when nearly all of the gas has been displaced from the sample volume. The cell was then isolated by closing a valve on top of the cell, and the solvent is then compressed to about 10 MPa using the overburden fluid PD pump. Liquid $CO_2$ at ambient temperature was then compressed to the same pressure in a second PD pump. Tubing carried the $CO_2$ from the pump to the other side of the valve that retained the solvent within the sample volume of the cell. The valve was then quickly opened and the $CO_2$ pump was advanced as the overburden fluid pump was retracted at the same volumetric rate. This allowed for the well-controlled addition of $CO_2$ into the sample volume. When the desired volume of $CO_2$ had been introduced to the sample volume, both pumps were turned off and the valve on top of the cell was closed. By recording the initial and final volume of $CO_2$ in the finely calibrated PD pump (0.01 mL), and the initial and final temperature and pressure of the $CO_2$, an equation of state (NIST 2011) could be used to determine the amount of $CO_2$ displaced into the sample volume. The cell could then be heated to the desired temperature and the sample volume, which contained known amounts of solvent and $CO_2$, was then compressed via the slow addition of overburden fluid to the bottom of the cell. As the pressure was increased to ~14 MPa, the $CO_2$ and solvent(s) were mixed with the magnetically driven slotted fin impeller until a single, clear, homogeneous liquid phase (L) or fluid phase (F) was achieved. The sample volume was then very slowly expanded at constant temperature until a bubble point was observed. Pressure was determined from a certified Heise gage (14 MPa±0.03 MPa) that measured the pressure of the overburden fluid. Bubble point measurements were repeated five times and average value was reported as the bubble point.

Because the (mass) solubility of hydrogen in these solvents was significantly less than of $CO_2$ in the pressure range of interest, it was not possible to accurately add very small amounts of dense $H_2$ to the cell using the same technique. Therefore the method of charging $H_2$ involved loading the Pyrex tube and solvent into the cell and then flushing the space above the liquid solvent with low pressure $H_2$ in order to displace the air from the sample volume. The gas and liquid were not mixed during this process in order to reduce the dissolution of $H_2$ in the solvent during this process. The flow of hydrogen was then stopped and the sample volume, which contained the solvent and $H_2$ at atmospheric pressure, was isolated. The volume of $H_2$ was determined as the product of the height of the sample volume above the liquid (as measured with a cathetometer) and the circular crosssectional area of the tube. The mass of $H_2$ in the sample volume was calculated as the product of gas volume and $H_2$ density (NIST 2011); the amount of $H_2$ that may have dissolved in the solvent at 0.1 MPa during the introduction of $H_2$ was assumed to be negligible. The $H_2$-solvent mixture was then compressed and stirred until a single phase was attained.

Measurement of Isotherms of Binary Mixture

The isotherms of $CO_2/H_2$ binary mixture were measured in a closed 1 liter stainless steel stirred tank reactor (Autoclave Engineer, PA) using the dynamic pressure-step method (Zieverink, 2006). In a typical experiment, 300 mL of solvent was added to reactor. Before the measurement, solvent was degassed for 1 hour under vacuum. At a set temperature, pure $CO_2$ was quickly fed into reactor from a high pressure $CO_2$ reservoir to a certain pressure point. After a few seconds for gas phase reached equilibrium, the mixer was turn on. The pressure decayed along with the time until it reached the equilibrium. Then, pure $H_2$ was fed into reactor from a high pressure $H_2$ reservoir to a pressure with equal molar ratio of $H_2$ and $CO_2$. Given the fact that $H_2$ is a weaker absorbate compared to $CO_2$, it is fair to assume that the small pressure drop was due to the absorption of $H_2$ only. The same procedure was repeated for different partial pressure of $CO_2$ and $H_2$ at the same temperature, to give isotherms of $CO_2$ and $H_2$ in solvents.

Figure 16:
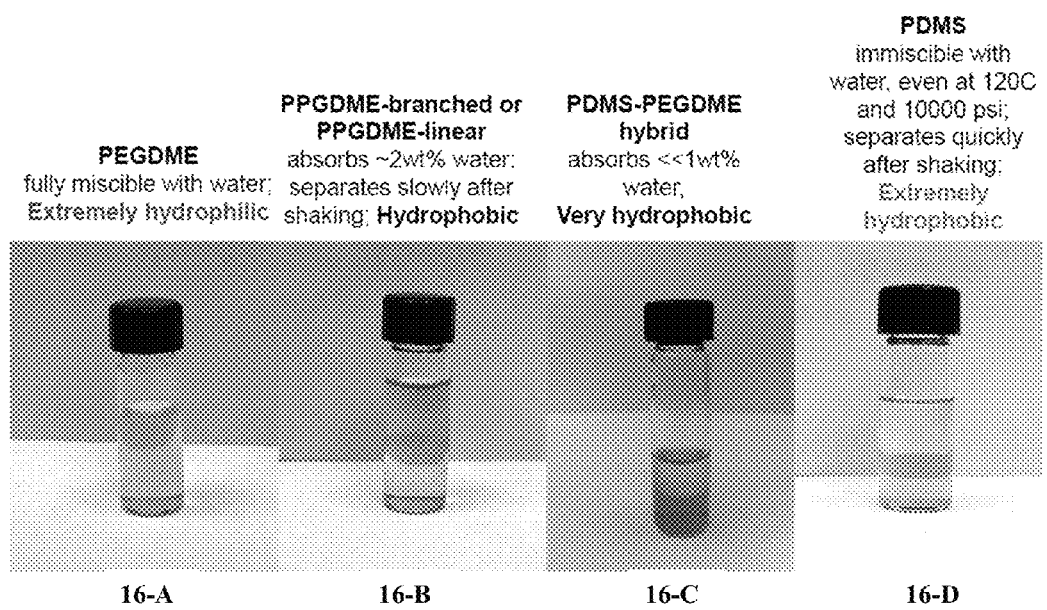
FIG. 16 illustrates by photographs solubility of water in four solvent systems: (16-A) PEGDME, (16-B) PPGDME-branched or PPGDME-linear, (16-C) new PDMS-PEGDME hybrid, and (16-D) PDMS.

Photograph of Phase Separation: FIG. 16

The phase separation properties were also evaluated and captured with photography. In FIG. 16, methylene orange was used as a dye in the water phase. In each vial, shown as 16-A, 16-B, 16-C, and 16-D respectively, 2 mL of the solvent, polyethylene glycol dimethyl ether (PEGDME), polypropylene glycol dimethyl ether (PPGDME), the modified siloxane compound, and polydimethylsiloxane (PDMS) were mixed with 1 mL of water and shaken to show the miscible or immiscible behavior of these solvents.

REFERENCES

V. I. Baranenko, V. S. Kirov, *Solubility of hydrogen in water in a broad temperature and pressure range*, Atomnaya Énergiya, Vol. 66, No. 1, pp. 24-28, January, (1989).
Brunner, E., *Solubility of hydrogen in 10 Organic Solvents at 298.15, 323.15, and 373.15 K*, J. Chem. Eng. Date, 30, 269-273 (1985).
H.-S. Byun, *Journal of Industrial and Engineering Chemistry*, 19, 665-669 (2013).
C. Descampes, C. Coquelet, C. Bouallou, D. Richon, *Solubility of hydrogen in methanol at temperatures from 248.41 to 308.20 K*, Thermochimica Acta 430 1-7 (2005).
A. Henni, P. Tontiwachwuthikul, A. Chekma, *Solubilities of Carbon Dioxide in Polyethylene Glycol Ethers*, Can. J. Chem. Eng., 83, 358-361 (2005).
M. B. Miller, D-L Chen, H-B Xie, D. R. Luebke, J. K. Johnson, R. M. Enick, *Solubility of $CO_2$ in $CO_2$-philic oligomers; COSMOtherm predictions and experimental results* Fluid. Phase, Equil. 287, 26-32 (2009).
M. B. Miller, D. R. Luebke, and R. M. Enick, *$CO2$-philic Oligomers as Novel Solvents for $CO_2$ Absorption*. Energy Fuels, 24, 6214-6219 (2010).
National Institute of Standards and Technology, Standard Reference Database Number 69, (2011); http://webbook.nist.gov/chemistry.
F. Porcheron, A. Gibert, P. Mougin, A. Wender, *High Throughput Screening of $CO_2$ Solubility in Aveous Monoamine Solutions*, Environ. Sci. Techol. 45, 2486-2492 (2011).
J. W. Prather, A. M. Ahangar, W. S. Pitts, J. P. Hemnley, A. R. Tarrer, J. A. Guin, Solubility of hydrogen in Creosote Oil at High Temperature and Pressure, *Ind. Eng. Chem., Process. Des. Dev.*, 16(3) 267-270 (1977).
S. Raeissi, and C. J. Peters, *Solubility in Ionic Liquids, Including Experimental Data in [bmim][Tf$_2$N]*, AIChE Journal, November, 58(11) 3553-3559 (2012).
J. J. Simnick, H. M. Sebastian, H.-M. Lin, K.-C. Chao, *Solubility of Hydrogen in Toluene at Elevated temperatures and Pressures*, Journal of Chemical and Engineering Data, Vol. 23(4) 339-340 (1978).
G. D. Wedlake, D. B. Robinson, *Solubility of Carbon dioxide in silicone Oil, J. Chem. Eng. Data.*, 24, 305-6 (1979).
Y. Xu, R. P. Scutte, L. G. Helper, *Solubilities of Carbon Dioxide, Hydrogen Sulfide and Sulphur Dioxide in Physical Solvents, Can. J. Chem. Eng.*, 70, 569-573 (1992).
M. M. P. Zieverink, M. T. Kreutzer, F. Kapteijn, J. A. Moulijn, *Ind. Eng. Chem. Res.*, 45 (13), 4574-4581 (2006).

What is claimed is:
1. A method comprising:
    contacting at least one first composition comprising carbon dioxide with at least one second composition to at least partially dissolve the carbon dioxide of the first composition in the second composition, wherein the second composition comprises at least one siloxane compound which is covalently modified with at least one non-siloxane group comprising at least one heteroatom.
2. The method of claim 1, wherein the heteroatom is nitrogen or oxygen.
3. The method of claim 1, wherein the heteroatom is oxygen.
4. The method of claim 1, wherein the non-siloxane group comprising at least one heteroatom comprises an alkyleneoxy group, an amino group, an ester group, or a ketone group.
5. The method of claim 1, wherein the non-siloxane group comprising at least one heteroatom comprises an alkyleneoxy group.
6. The method of claim 1, wherein the compound has 3 or 4 Si atoms.
7. The method of claim 1, wherein the compound has a molecular weight of 500 g/mol or less.
8. The method of claim 1, wherein the compound is a liquid or oil when pure at 25° C.
9. The method of claim 1, wherein the siloxane compound is represented by:

wherein A is a group comprising the siloxane moiety, and B is the non-siloxane group comprising the heteroatom, and A and B are covalently linked, and the values x and y, independently of each other, are integers, 1-10.
10. The method of claim 1, wherein the siloxane compound is represented by $(A)_x$-$(B)_y$-$(A)_x$, wherein B is the non-siloxane moiety and A is a siloxane moiety and y is 1 and x is 1.
11. The method of claim 1, wherein the siloxane compound is represented by:

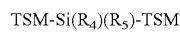

wherein each TSM is independently a terminal siloxane moiety, wherein the TSM is represented by the monovalent group represented by $R_1R_2R_3$—Si—O— wherein $R_1$, $R_2$, $R_3$ are monovalent alkyl moieties such as a $C_1$-$C_{10}$ moiety such as methyl or ethyl; and wherein $R_4$ also is a monovalent alkyl moiety such as a $C_1$-$C_{10}$ moiety such as methyl or ethyl; and $R_5$ is the non-siloxane group comprising the heteroatom such as oxygen or nitrogen.

12. The method of claim 1, wherein the first composition further comprises hydrogen and water, and the water is present in the first composition in a saturation amount.

13. The method of claim 1, wherein the contacting step is carried out at a temperature of about 0° C. to about 90° C.

14. The method of claim 1, wherein after the contacting step, the second composition with its dissolved carbon dioxide is subjected to one or more carbon dioxide removal steps to form a third composition which is further contacted with a first composition comprising carbon dioxide.

15. A method comprising:
    capturing carbon dioxide with use of a physical solvent of an ethylene oxide modified polydimethylsiloxane compound.

16. A method comprising capturing carbon dioxide by contacting a composition with a gaseous composition, wherein the composition comprises at least one siloxane compound which is covalently modified with at least one non-siloxane group comprising at least one heteroatom, wherein the compound has a molecular weight of 500 g/mol or less.

* * * * *